(12) United States Patent
Covens et al.

(10) Patent No.: US 12,523,653 B2
(45) Date of Patent: Jan. 13, 2026

(54) METHOD FOR MEASURING ANALYTE CONCENTRATION

(71) Applicant: miDiagnostics NV, Heverlee (BE)

(72) Inventors: Kris Covens, Leuven (BE); Willem Van Roy, Leuven (BE); Tim Stakenborg, Leuven (BE); Cindy Liu, Baltimore, MD (US); Jennifer Satterwhite Warden, Timberlake, NC (US)

(73) Assignee: miDiagnostics NV, Heverlee (BE)

( * ) Notice: Subject to any disclaimer, the term of this patent is extended or adjusted under 35 U.S.C. 154(b) by 1002 days.

(21) Appl. No.: 17/636,843

(22) PCT Filed: Aug. 21, 2020

(86) PCT No.: PCT/EP2020/073507
§ 371 (c)(1),
(2) Date: Feb. 18, 2022

(87) PCT Pub. No.: WO2021/037728
PCT Pub. Date: Mar. 4, 2021

(65) Prior Publication Data
US 2023/0137689 A1 May 4, 2023

(30) Foreign Application Priority Data

Aug. 23, 2019 (EP) .................................... 19193427

(51) Int. Cl.
*G01N 33/543* (2006.01)
*B01L 3/00* (2006.01)
(52) U.S. Cl.
CPC .. *G01N 33/54366* (2013.01); *B01L 3/502715* (2013.01); *B01L 3/50273* (2013.01);
(Continued)

(58) Field of Classification Search
CPC ............... B01L 3/5027; B01L 3/50273; B01L 3/502769; B01L 3/502776; B01L 2200/10; B01L 2300/087; G01N 33/5436
See application file for complete search history.

(56) References Cited

U.S. PATENT DOCUMENTS

| 5,637,469 A | 6/1997 | Wilding et al. |
| 6,582,970 B1 | 6/2003 | Manita |

(Continued)

*Primary Examiner* — Jill A Warden
*Assistant Examiner* — Dwayne K Handy
(74) *Attorney, Agent, or Firm* — Hodgson Russ LLP (57) ABSTRACT

The present inventive concept relates to a method for measuring analyte concentration in a sample fluid, comprising: receiving dilution fluid or sample fluid comprising analyte in a microfluidic channel, wherein the dilution fluid or sample fluid further comprises a molecule which is different from the analyte; performing a first affinity-based assay in a first detection zone of the microfluidic channel to measure a signal indicative of the concentration of the molecule in the dilution fluid or sample fluid; mixing the dilution fluid or sample fluid in the microfluidic channel with another of the dilution fluid or sample fluid to obtain a diluted sample fluid; performing a second affinity-based assay in a second detection zone of the microfluidic channel to measure a signal indicative of the concentration of the molecule in the diluted sample fluid; performing a third assay in the second detection zone to measure a signal indicative of the concentration of the analyte in the diluted sample fluid; determining a concentration of the molecule in the received dilution fluid or sample fluid, based on the measured signal of the first affinity-based assay; determining a concentration of the molecule in the diluted sample fluid, based on the measured signal of the second affinity-based assay; and determining the analyte concentration in the sample fluid on basis of the measured signal indicative of the concentration of analyte in the diluted sample fluid and a (Continued)

ratio between the determined concentration of the molecule in the received dilution fluid or sample fluid and the determined concentration of the molecule in the diluted sample fluid. The present inventive concept further relates to a microfluidic arrangement for facilitating measurement of analyte concentration in a sample fluid, and to a system for measuring analyte concentration in a sample fluid, comprising the microfluidic arrangement, and to a diagnostic system comprising the microfluidic arrangement.

10 Claims, 3 Drawing Sheets (52) U.S. Cl.
CPC ... *B01L 3/502761* (2013.01); *B01L 2200/026* (2013.01); *B01L 2200/10* (2013.01); *B01L 2300/0636* (2013.01); *B01L 2300/0816* (2013.01); *B01L 2300/0861* (2013.01); *B01L 2400/0487* (2013.01)

(56) References Cited

U.S. PATENT DOCUMENTS

2003/0129671 A1* 7/2003 Wilding ............ B01L 3/502707
 435/7.2
2013/0260481 A1 10/2013 Shimizu et al.

* cited by examiner

METHOD FOR MEASURING ANALYTE CONCENTRATION

TECHNICAL FIELD

The present inventive concept relates to a method for measuring analyte concentration in a sample fluid. The present inventive concept further relates to a microfluidic arrangement for facilitating measurement of analyte concentration in a sample fluid; to a system for measuring analyte concentration in a sample fluid, comprising the microfluidic arrangement; and to a diagnostic device comprising the microfluidic arrangement.

BACKGROUND

When measuring a level of biomarkers in a sample using immunoassays, the sample frequently is mixed with a fluid to prepare the sample for the assay, for example if the sample is a patient derived body fluid, such as blood, serum, plasma, urine, or cerebrospinal fluid. To obtain a concentration of the biomarker present in the sample, volumes of the fluid and the sample are measured so that dilution of the sample is taken into account.

In a laboratory setting, reaction mixtures, thus, typically are generated by mixing well-defined volumes of liquids by pipetting by skilled personnel using calibrated materials or by robots that undergo frequent quality control and calibration procedures. However, it is problematic to achieve calibrated materials, and errors in calibration transform to inaccurate measurements.

With micro-scaled devices and particularly devices relying on capillary microfluidics, determination of accurate volumes or flowrates is problematic.

There is, thus, a need for methods and devices, particularly microfluidic methods and devices, for measuring analyte concentration in a sample fluid, which do not suffer from problems relating to prior art.

SUMMARY

According to a first aspect of the present inventive concept there is provided a method for measuring analyte concentration in a sample fluid, comprising:
receiving dilution fluid or sample fluid comprising analyte in a microfluidic channel, wherein the dilution fluid or sample fluid further comprises a molecule which is different from the analyte;
performing a first affinity-based assay in a first detection zone of the microfluidic channel to measure a signal indicative of the concentration of the molecule in the dilution fluid or sample fluid,
mixing the dilution fluid or sample fluid in the microfluidic channel with another of the dilution fluid or sample fluid to obtain a diluted sample fluid,
performing a second affinity-based assay in a second detection zone of the microfluidic channel to measure a signal indicative of the concentration of the molecule in the diluted sample fluid,
performing a third assay in the second detection zone to measure a signal indicative of the concentration of the analyte in the diluted sample fluid,
determining a concentration of the molecule in the received dilution fluid or sample fluid, based on the measured signal of the first affinity-based assay,
determining a concentration of the molecule in the diluted sample fluid, based on the measured signal of the second affinity-based assay
and
determining the analyte concentration in the sample fluid on basis of the measured signal indicative of the concentration of analyte in the diluted sample fluid and a ratio between the determined concentration of the molecule in the received dilution fluid or sample fluid and the determined concentration of the molecule in the diluted sample fluid.

According to a second aspect of the present inventive concept there is provided a microfluidic arrangement for facilitating measurement of analyte concentration in a sample fluid, comprising:
a first microfluidic channel arranged to receive dilution fluid or sample fluid, wherein the dilution fluid or sample fluid comprises a molecule which is different from the analyte,
a first detection zone arranged in the first microfluidic channel, wherein, in the first detection zone, a surface of the first microfluidic channel is provided with molecule affinity probes for binding the molecule to the surface, thereby allowing a signal indicative of the concentration of the molecule in the received dilution fluid or sample fluid to be measured in a first affinity-based assay,
an inlet arranged in the first microfluidic channel downstream of the first detection zone for introduction of another of the dilution fluid or sample fluid into the first microfluidic channel, thereby diluting the sample fluid with the dilution fluid to obtain a diluted sample fluid,
a mixer arranged in the first microfluidic channel downstream of the inlet for mixing the diluted sample fluid, and
a second detection zone arranged in the first microfluidic channel downstream of the mixer, wherein in the second detection zone, a surface of the first microfluidic channel is provided with molecule affinity probes for binding the molecule to the surface, thereby allowing a signal indicative of the concentration of the molecule in the diluted sample fluid to be measured in a second affinity-based assay
wherein the second detection zone further is arranged for allowing a signal indicative of the concentration of the analyte to be measured.

According to a third aspect of the inventive concept, there is provided a system for measuring analyte concentration in a sample fluid, comprising:
the microfluidic arrangement of the second aspect,
a detector for detecting a signal indicative of the concentration of the molecule in the received dilution fluid or sample fluid,
a signal indicative of the concentration of the molecule in the diluted sample fluid, and
a signal indicative of the concentration of the analyte in the diluted sample fluid, and
a processing device arranged for
determining a concentration of the molecule in the received dilution fluid or sample fluid, based on the detected signal indicative of the concentration of the molecule in the received dilution fluid or sample fluid,
determining a concentration of the molecule in the diluted sample fluid, based on the detected signal indicative of the concentration of the molecule in the diluted sample fluid, and determining the analyte concentration in the sample fluid on basis of the detected signal indicative of the concentration of analyte in the diluted sample fluid and a ratio between the determined concentration of the molecule in the received dilution fluid or sample fluid and the determined concentration of the molecule in the diluted sample fluid.

According to a fourth aspect of the inventive concept, there is provided a diagnostic device comprising the microfluidic arrangement of the second aspect or the system of the third aspect.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

In view of the above, it would be desirable to achieving assays which are not compromised by errors or problems related to volumes of fluids mixed for the assay. An objective of the present inventive concept is to address this issue and to provide solutions to at least one problem related to prior art. Further and alternative objectives may be understood from the following. The present inventive concept is, at least in part, based on an insight that determination of dilution or dilution factors in assays contributes to solving problems identified with prior art. According to the present inventive concept, the dilution may be determined or quantified for each sample analysis and taken into account when determining analyte concentration, which minimises or avoids problems of prior art.

It shall be realised from the discussions herein that the inventive concepts relate to the provision of determinations relating to the volume to volume ratio of the sample fluid and the dilution fluid in a microfluidic channel, and further to take advantage of such a relationship to provide determination of the analyte concentration in the sample fluid. Determination relating to a volume to volume ratio of the sample fluid and the dilution fluid may be realised according to the present inventive concepts by providing a molecule to either the sample liquid or the dilution liquid and determining signals relating to the concentration of the molecule prior to and after mixing of sample liquid and dilution liquid without a need of measuring or providing control of volumes.

Disclosures herein relating to one inventive aspect of the inventive concept generally may further relate to one or more of the other aspect(s) of the inventive concept.

According to a first aspect of the present inventive concept there is provided a method for measuring analyte concentration in a sample fluid, comprising:

receiving dilution fluid or sample fluid comprising analyte in a microfluidic channel, wherein the dilution fluid or sample fluid further comprises a molecule which is different from the analyte;

performing a first affinity-based assay in a first detection zone of the microfluidic channel to measure a signal indicative of the concentration of the molecule in the dilution fluid or sample fluid, mixing the dilution fluid or sample fluid in the microfluidic channel with another of the dilution fluid or sample fluid to obtain a diluted sample fluid, performing a second affinity-based assay in a second detection zone of the microfluidic channel to measure a signal indicative of the concentration of the molecule in the diluted sample fluid, performing a third assay in the second detection zone to measure a signal indicative of the concentration of the analyte in the diluted sample fluid, determining a concentration of the molecule in the received dilution fluid or sample fluid, based on the measured signal of the first affinity-based assay, determining a concentration of the molecule in the diluted sample fluid, based on the measured signal of the second affinity-based assay and determining the analyte concentration in the sample fluid on basis of the measured signal indicative of the concentration of analyte in the diluted sample fluid and a ratio between the determined concentration of the molecule in the received dilution fluid or sample fluid and the determined concentration of the molecule in the diluted sample fluid.

Mixing of the dilution fluid and sample fluid enables provision of a fluid which is suitable for analysis, for example, with regard to concentration, viscosity, pH, and/or ionic strength.

The dilution fluid or sample fluid further comprising a molecule which is different from the analyte, enables determination of dilution factors based on measurement of the molecule. The molecule being different from the analyte enables differentiating the molecule and the analyte in assays and measurements.

Performing a first affinity-based assay in a first detection zone of the microfluidic channel to measure a signal indicative of the concentration of the molecule in the dilution fluid or sample fluid, allows for determining the concentration of the molecule in the received dilution fluid or sample fluid, based on the measured signal of the first affinity-based assay.

Mixing the dilution fluid or sample fluid in the microfluidic channel with another of the dilution fluid or sample fluid to obtain a diluted sample fluid, allows for the sample fluid to be mixed with dilution fluid.

Performing a second affinity-based assay in a second detection zone of the microfluidic channel to measure a signal indicative of the concentration of the molecule in the diluted sample fluid, allows for determining the concentration of the molecule in the diluted sample fluid, based on the measured signal of the second affinity-based assay.

The determining the concentration of the molecule in the diluted sample fluid allows for determination of a dilution factor resulting from the mixing the dilution fluid or sample fluid, when comparing with the concentration of the molecule in the received dilution fluid or sample fluid.

The performing a third assay to measure a signal indicative of the concentration of the analyte in the diluted sample fluid, allows for determining the analyte concentration in the sample fluid on basis of the measured signal indicative of the concentration of analyte in the diluted sample fluid and a ratio between the determined concentration of the molecule in the received dilution fluid or sample fluid and the determined concentration of the molecule in the diluted sample fluid.

The third assay may suitably be selected for the analyte. The third assay may be based on colorimetry, absorption based colorimetry, Raman techniques, changes in refractive index, and/or spectroscopy. The third assay may be an affinity-based assay. The third assay may further be an assay other than affinity-based assays. The third assay may be based on interaction, such as for concentration and/or retardation of the analyte. The third assay may alternatively not be based on interaction. The third assay may comprise a detection method, for example based on spectrometry or spectroscopy, with or without being combined with interaction.

For at least one of the first affinity-based assay, the second affinity-based assay, and the third assay, an evanescent technique may be used to perform at least one of: causing generation of the signal indicative of the concentration of the molecule or analyte; and collecting the signal indicative of the concentration of the molecule or analyte.

The evanescent technique allows the signal to be generated and/or collected without having to wash away molecules or analytes present in bulk solution.

The signal allowed by the evanescent technique may be a signal derived from absorption of light, reflection of light, emission of light, scattering of light, change in refractive index, or transformation of light, or combinations thereof.

For at least one of the first affinity-based assay, the second affinity-based assay, and the third assay, a waveguide arranged adjacent to a surface of the microfluidic channel may be used to perform at least one of:

causing generation of the signal indicative of the concentration of the molecule or analyte, and
 collecting the signal indicative of the concentration of the molecule or analyte.

Such an arranged waveguide allows for electromagnetic radiation, for example light, to be transmitted to and/or from the first detection zone and the second detection zone. Such a waveguide further allows for the evanescent technique and creation of an evanescent field. Thereby, interaction of electromagnetic radiation with molecules close to the surface but not in a bulk may be enabled.

The determining the analyte concentration in the sample fluid may involve calibration.

The determining the analyte concentration in the sample fluid may comprise using a calibration curve.

The third assay may be an affinity-based assay.

Thereby, selective binding and/or analysis may be realised.

All of the first assay, the second assay, and the third assay being affinity based provides for further benefits including allowing of improvement in efficiency of manufacturing of microfluidic arrangements for facilitating the method for measuring analyte concentration in a sample fluid.

The affinity-based assay may be an immuno-based assay, a receptor-based assay, an antigen-based assay, an aptamer-based assay, a nucleic acid-based assay, or a molecularly imprinted polymer-based assay.

Thereby selective binding and/or analysis may be realised for different types of analytes and/or different type of affinity probes.

The molecule may be selected to reduce cross-talk between the second affinity-based assay and the third assay. The cross-talk may be essentially zero or negligible according to example embodiments.

The molecule may be selected to provide a cross-talk of 20% or below, for example 10% or below, or 1 or below, of the signal indicative of the measured analyte.

The dilution fluid may be a buffer fluid. Thereby, a suitable pH for the assays may be obtained.

The dilution fluid may be an aqueous liquid. The dilution fluid may, to a major part, comprise water.

The analyte may be a biomarker, and the sample fluid is a body fluid.

The molecule may, for example, be selected from peptides.

The concentration of the molecule expressed in molar may be of a same order of magnitude as a concentration of the analyte, in the diluted sample fluid.

The concentration of the molecule may be similar to the concentration of the analyte, in the diluted sample fluid.

The molecule may be provided in solid form in the microfluidic channel, and the molecule may be added to the dilution fluid or sample fluid by contacting the dilution fluid or sample fluid with the molecule in solid form, thereby dissolving the molecule in the dilution fluid or sample fluid.

The molecule provided in solid form allows for long-term stable storage of the molecule in the microfluidic channel. Such provided molecules enable efficient control of amount of molecules to be added to the fluid.

According to a second aspect of the present inventive concept there is provided a microfluidic arrangement for facilitating measurement of analyte concentration in a sample fluid, comprising:

a first microfluidic channel arranged to receive dilution fluid or sample fluid, wherein the dilution fluid or sample fluid comprises a molecule which is different from the analyte,
 a first detection zone arranged in the first microfluidic channel, wherein, in the first detection zone, a surface of the first microfluidic channel is provided with molecule affinity probes for binding the molecule to the surface, thereby allowing a signal indicative of the concentration of the molecule in the received dilution fluid or sample fluid to be measured in a first affinity-based assay,
 an inlet arranged in the first microfluidic channel downstream of the first detection zone for introduction of another of the dilution fluid or sample fluid into the first microfluidic channel, thereby diluting the sample fluid with the dilution fluid to obtain a diluted sample fluid,
 a mixer arranged in the first microfluidic channel downstream of the inlet for mixing the diluted sample fluid, and
 a second detection zone arranged in the first microfluidic channel downstream of the mixer, wherein in the second detection zone, a surface of the first microfluidic channel is provided with molecule affinity probes for binding the molecule to the surface, thereby allowing a signal indicative of the concentration of the molecule in the diluted sample fluid to be measured in a second affinity-based assay
 wherein the second detection zone further is arranged for allowing a signal indicative of the concentration of the analyte to be measured.

In the second detection zone, the surface of the first microfluidic channel may further be provided with analyte affinity probes for binding the analyte to the surface, thereby allowing a signal indicative of the concentration of the analyte to be measured in a third affinity-based assay.

The microfluidic arrangement may further comprise a molecule pick-up zone arranged along the first microfluidic channel upstream of the first detection zone for adding the molecule to the received dilution fluid or sample fluid.

The microfluidic channel may be arranged to be connected to a pump for active pumping of fluids in the microfluidic channel, or arranged for passive pumping of fluids in the microfluidic channel.

The pump for active pumping of fluids in the microfluidic channel may be, for example, a pressure driven or a displacement driven pump.

The microfluidic channel being arranged for passive pumping may be passive pumping by capillary action.

The pump for active pumping may be arranged in fluidic connection with the first microfluidic channel upstream, in relation to a fluidic flow direction of the microfluidic channel, the first detection zone, and/or be arranged in fluidic connection with the inlet.

The passive pumping may be arranged in fluidic connection with an outlet of the microfluidic channel.

Thereby, fluids may be actuated desirably in the microfluidic channel.

The microfluidic arrangement may further comprise a second microfluidic channel fluidically connected to the first microfluidic channel, and further arranged for transferring dilution fluid or sample fluid into the first microfluidic channel via the inlet.

The affinity-based assay may be an immuno-based assay, a receptor-based assay, an antigen-based assay, an aptamer-based assay, a nucleic acid-based assay, or a molecularly imprinted polymer-based assay.

The first, second, and third affinity based assays may be immunoassays being enzyme-linked immunosorbent assays or fluorescence-linked immunosorbent assays.

The mixer may be a portion of the microfluidic channel, or may be separate structure connected with the microfluidic channel.

The surface of the first microfluidic channel in the first detection zone, and the surface of the first microfluidic channel in the second detection zone, each may be adjacent to a waveguide.

The surface of the first microfluidic channel in the first detection zone, and the surface of the first microfluidic channel in the second detection zone, each may be adjacent to an individual waveguide or a common waveguide.

Such an arrangement may be used to realise measurements of signals indicative of the concentrations.

According to a third aspect of the inventive concept, there is provided a system for measuring analyte concentration in a sample fluid, comprising:
  the microfluidic arrangement of the second aspect,
  a detector for detecting
  a signal indicative of the concentration of the molecule in the received dilution fluid or sample fluid,
  a signal indicative of the concentration of the molecule in the diluted sample fluid, and
  a signal indicative of the concentration of the analyte in the diluted sample fluid, and
  a processing device arranged for
  determining a concentration of the molecule in the received dilution fluid or sample fluid, based on the detected signal indicative of the concentration of the molecule in the received dilution fluid or sample fluid,
  determining a concentration of the molecule in the diluted sample fluid, based on the detected signal indicative of the concentration of the molecule in the diluted sample fluid, and
  determining the analyte concentration in the sample fluid on basis of the detected signal indicative of the concentration of analyte in the diluted sample fluid and a ratio between the determined concentration of the molecule in the received dilution fluid or sample fluid and the determined concentration of the molecule in the diluted sample fluid.

The system for measuring analyte concentration in a sample fluid may further comprise a light source for providing light to the first, second and third detection zones.

According to a fourth aspect of the inventive concept, there is provided a diagnostic device comprising the microfluidic arrangement of the second aspect or the system of the third aspect.

Figure 1:
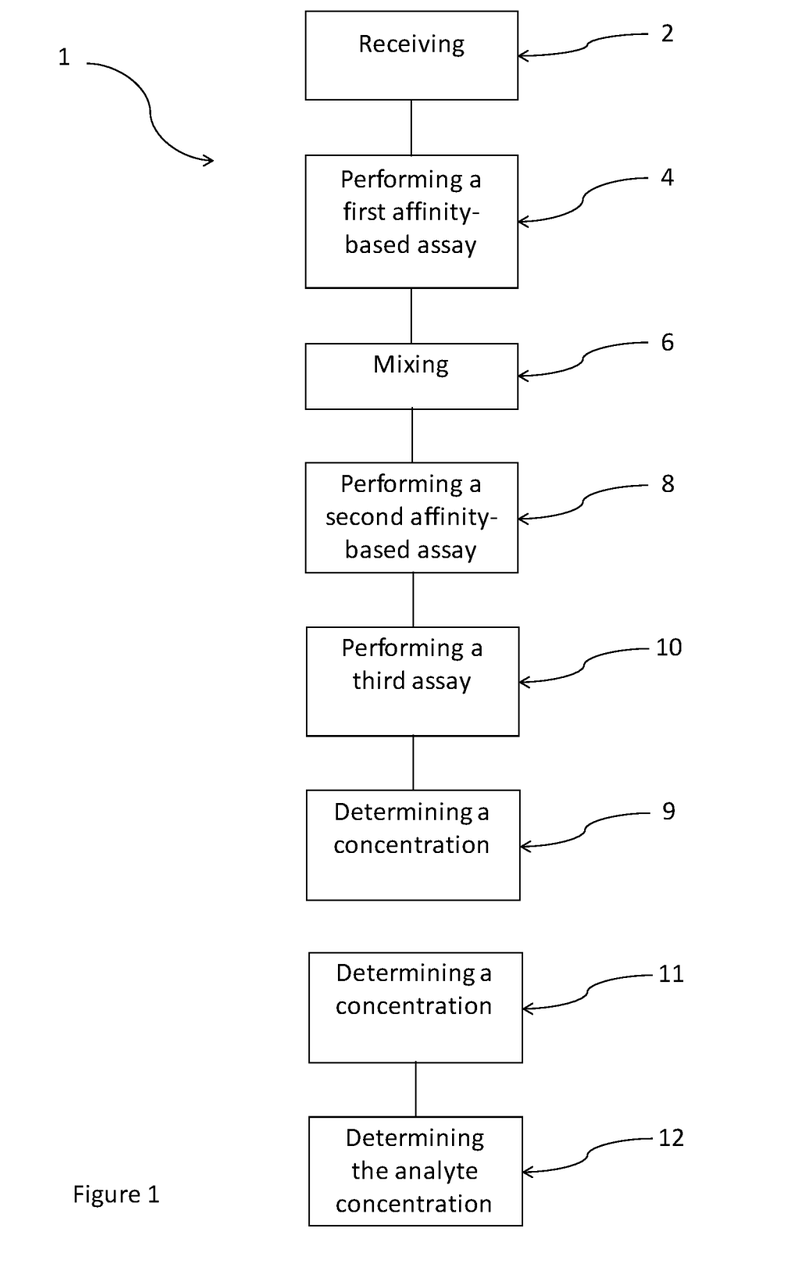
FIG. 1 is a schematic illustration of a method according to the first inventive concept.

With reference to FIG. 1 a method 1 for measuring analyte concentration in a sample fluid will be discussed. The method 1 comprises:
  receiving 2 dilution fluid or sample fluid comprising analyte in a microfluidic channel, wherein the dilution fluid or sample fluid further comprises a molecule which is different from the analyte,
  performing 4 a first affinity-based assay in a first detection zone of the microfluidic channel to measure a signal indicative of the concentration of the molecule in the dilution fluid or sample fluid,
  mixing 6 the dilution fluid or sample fluid in the microfluidic channel with another of the dilution fluid or sample fluid to obtain a diluted sample fluid,
  performing 8 a second affinity-based assay in a second detection zone of the microfluidic channel to measure a signal indicative of the concentration of the molecule in the diluted sample fluid,
  performing 10 a third assay in the second detection zone to measure a signal indicative of the concentration of the analyte in the diluted sample fluid,
  determining 9 a concentration of the molecule in the received dilution fluid or sample fluid, based on the measured signal of the first affinity-based assay,
  determining 11 a concentration of the molecule in the diluted sample fluid, based on the measured signal of the second affinity-based assay
  and
  determining 12 the analyte concentration in the sample fluid on basis of the measured signal indicative of the concentration of analyte in the diluted sample fluid and a ratio between the determined concentration of the molecule in the received dilution fluid or sample fluid and the determined concentration of the molecule in the diluted sample fluid.

Measuring a signal indicative of the concentration, as used herein, may comprise suitable means or methods to obtain a determination relating to the concentration. For example, a spectrometer, a photodetector, an imager, a photomultiplier tube, or PMT, or avalanche photodiode, or APD, or an array thereof may be used for the assay to provide an output signal relating to a concentration of molecules or analytes from the assay, which output signal may, directly or indirectly, result in a signal indicative of the concentration. The concentration may, optionally, directly or indirectly be determined from the signal.

The determining 9 a concentration of the molecule in the received dilution fluid or sample fluid, based on the measured signal of the first affinity-based assay, and/or determining 11 a concentration of the molecule in the diluted sample fluid, based on the measured signal of the second affinity-based assay, may be realised in a plurality of different ways. Different methodologies and ways are known which may be employed to correlate the measured signals with corresponding concentrations. The determining the concentrations may, for example, involve calibration curves.

The determining 12 the analyte concentration in the sample fluid on basis of the measured signal indicative of the concentration of analyte in the diluted sample fluid and a ratio between the determined concentration of the molecule in the received dilution fluid or sample fluid and the determined concentration of the molecule in the diluted sample fluid may be realised in a plurality of different ways. It shall be understood that the ratio between the determined concentration of the molecule in the received dilution fluid or sample fluid and the determined concentration of the molecule in the diluted sample fluid allows determination of the volumetric ratio between dilution fluid and sample fluid received for the method. It will for a clarifying example now be assumed that the method 1 is performed by receiving 2 a dilution fluid. If it, for example, may be determined that the concentration of the molecule in the diluted sample fluid is one quarter of the concentration of the molecule in the received dilution fluid, the molecule has been diluted by a factor four. It may then be determined that the volumetric ratio of dilution fluid to sample fluid is 1:3. Based on this, the concentration of analyte in the sample fluid may be determined from a determined concentration of the analyte in the diluted sample fluid. There is a plurality of different ways to perform calculations, for example by man or a processor, to determine the analyte concentration in the sample fluid according to the inventive concept.

For at least one of the first affinity-based assay, the second affinity-based assay, and the third assay, an evanescent technique may be used to perform at least one of: causing generation of the signal indicative of the concentration of the molecule or analyte; and collecting the signal indicative of the concentration of the molecule or analyte.

By using an evanescent technique, molecules and/or analytes bound to affinity probes may be analysed without or with decreased interference from compounds present further away from the affinity probes, such as in the bulk liquid of the microfluidic channel. Thereby, flushing of the microfluidic channel may be avoided. Evanescent techniques may take advantage of, for example, luminescent techniques, Raman techniques, and SERS techniques.

Figure 3:
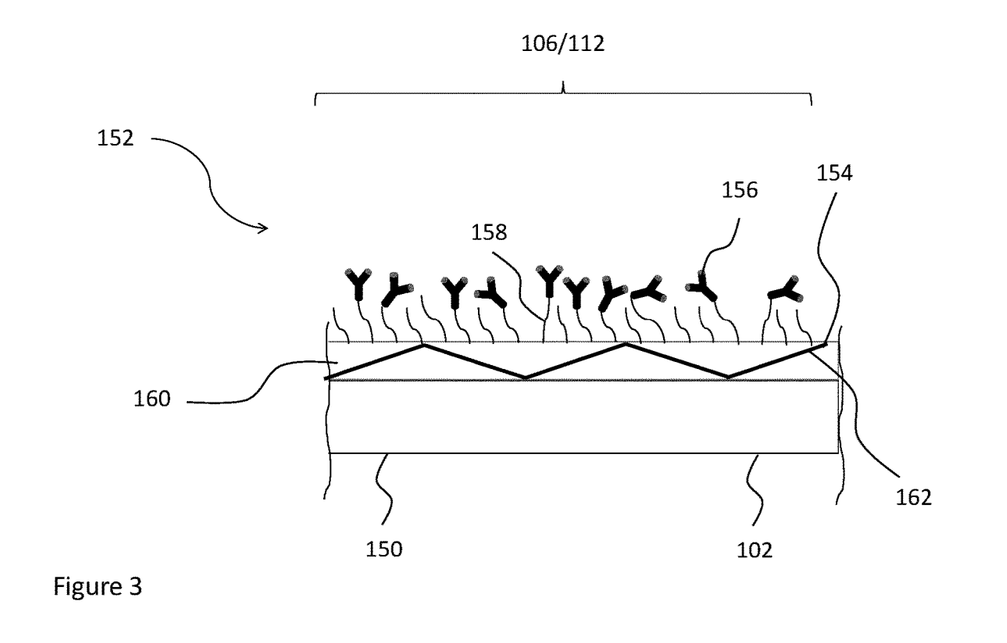
FIG. 3 is a schematic illustration of a portion of a microfluidic channel.

Discussions herein relating to FIG. 3, schematically illustrating an affinity-based assay combined with an evanescent technique using a wave guide, further explain evanescent techniques which may be used according to the inventive concept.

The determining 12 the analyte concentration in the sample fluid may comprise using a calibration curve.

The third assay may be any suitable assay. For example, the third assay may be an affinity-based assay. The third assay may further be an assay other than affinity-based assays. The third assay may comprise interaction between the analyte and a phase, for concentration and/or retention of the analyte. The third assay may alternatively not be based on interaction. The third assay may comprise a detection method, for example based on spectrometry or spectroscopy with or without being combined with interaction.

The affinity-based assay may be an immuno-based assay, a receptor-based assay, an antigen-based assay, an aptamer-based assay, a nucleic acid-based assay, or a molecularly imprinted polymer-based assay.

The molecule may be selected to reduce cross-talk between the second affinity-based assay and the third assay. For example, the molecule may be selected to have groups or functionalities different from groups of the analyte involved in the binding. The cross-talk may be essentially zero or negligible according to example embodiments. The molecule may be selected to provide a cross-talk of 20% or below, for example 10% or below, or 1% or below, or 0.1% or below, of the signal indicative of the measured analyte. By decreasing cross-talk, increased accuracy of the assays may be obtained.

The dilution fluid may be a buffer fluid, thereby providing a predetermined pH within the microfluidic channel. Additives may be added to the dilution fluid or the sample fluid, to provide desired properties of the fluids or the assays.

The analyte may be a biomarker, and the sample fluid a body fluid. Assays of such a sample fluid may benefit from mixing with a dilution fluid, for example by providing certain levels of ions, pH, reagents or agents having an effect of solubility, binding or stability of the analyte.

Figure 2:
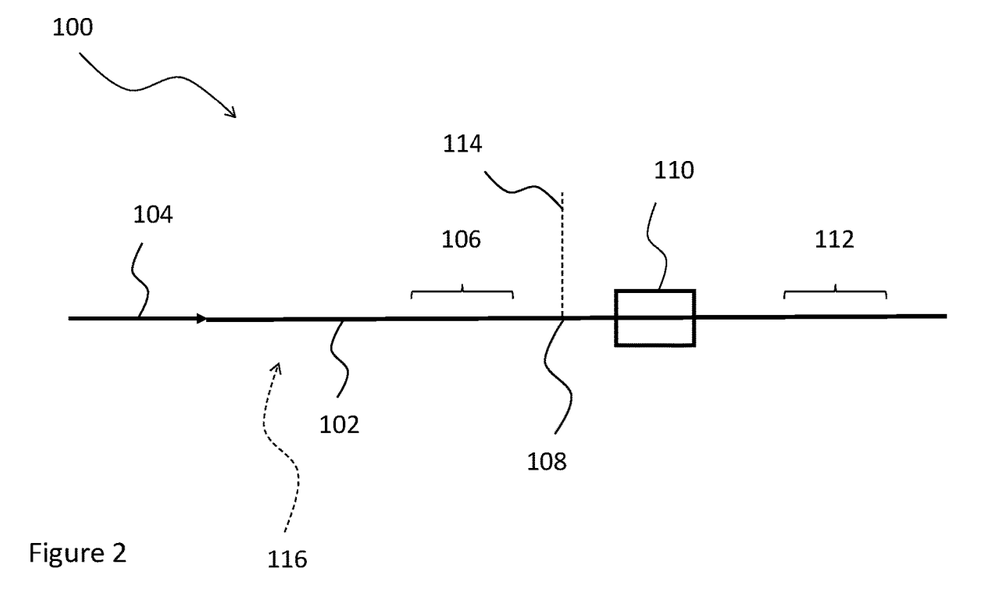
FIG. 2 is a schematic illustration of a microfluidic arrangement for facilitating measurement of analyte concentration in a sample fluid.

FIG. 2 illustrates a microfluidic arrangement 100 for facilitating measurement of analyte concentration in a sample fluid. The microfluidic arrangement 100 comprises a first microfluidic channel 102 arranged to receive dilution fluid or sample fluid as illustrated by arrow 104, wherein the dilution fluid or sample fluid comprises a molecule (not illustrated) which is different from the analyte. A first detection zone 106 is arranged in the first microfluidic channel 102, wherein, in the first detection zone 106, a surface (not illustrated) of the first microfluidic channel 102 is provided with molecule affinity probes for binding the molecule to the surface, thereby allowing a signal indicative of the concentration of the molecule in the received dilution fluid or sample fluid to be measured in a first affinity-based assay. Such an assay may take advantage of, for example, luminescence or SERS-signals from bound molecules. An inlet 108 is arranged in the first microfluidic channel 102 downstream of the first detection zone 106 for introduction of another of the dilution fluid or sample fluid into the first microfluidic channel 102, thereby diluting the sample fluid with the dilution fluid to obtain a diluted sample fluid. A mixer 110 is arranged in the first microfluidic channel 102 downstream of the inlet 108 for mixing the diluted sample fluid. Such a mixer may be any suitable mixer for mixing of the fluids, for example static mixers or mixers taking advantage of moving parts. The mixer may comprise a series of turns of the microfluidic channel, such as a serpentine or undulating shaped microfluidic channel. Alternatively, the mixer may be an off channel mixer. A second detection zone 112 is arranged in the first microfluidic channel 102 downstream of the mixer 110, wherein in the second detection zone 112, a surface (not illustrated) of the first microfluidic channel 102 is provided with molecule affinity probes for binding the molecule to the surface. Thereby a signal indicative of the concentration of the molecule in the diluted sample fluid is allowed to be measured in a second affinity-based assay. Such an assay, and other assays of the inventive concept, may take advantage of, for example, luminescence or SERS-signals from bound molecules. The second detection zone 112 is further arranged for allowing a signal indicative of the concentration of the analyte to be measured. In the second detection zone 112, the surface of the first microfluidic channel 102 may further be provided with analyte affinity probes for binding the analyte to the surface.

The microfluidic arrangement 100 may further and optionally comprise a second microfluidic channel 114 fluidically connected to the first microfluidic channel, and further arranged for transferring dilution fluid or sample fluid into the first microfluidic channel via the inlet 108.

With an arrangement as discussed with reference to FIG. 2 and a method discussed with reference to FIG. 1, the analyte may be, for example, a biomarker present in a sample fluid being a sample from a patient, such as a urine, blood, or plasma sample. Direct analysis on such samples may be difficult due to the complex sample matrix. With the methods and arrangement of the inventive concept, the sample fluid is diluted with dilution liquid, which allows for efficient analysis.

Optionally, the microfluidic arrangement may further comprise a molecule pick-up zone 116 arranged along the first microfluidic channel 102 upstream of the first detection zone 106 for adding the molecule to the received dilution fluid or sample fluid. The molecule pick-up zone 116 may be arranged to hold an amount of the molecule in solid form.

Although not illustrated in FIG. 2, the microfluidic channel may be arranged to be connected to a pump for pumping of fluids in the microfluidic channel. The pump may, for example, be connected downstream of the second detection zone 112, such as at an outlet of the microfluidic channel 102.

The affinity-based assays discussed with reference to FIG. 1 and FIG. 2, may individually be selected from an immuno-based assay, a receptor-based assay, an antigen-based assay, an aptamer-based assay, a nucleic acid-based assay, and a molecularly imprinted polymer-based assay.

For example, the first, second, and third affinity based assays may be immunoassays being enzyme-linked immunosorbent assays.

For at least one of the first affinity-based assay, the second affinity-based assay, and the third assay, a waveguide arranged adjacent to a surface of the microfluidic channel may be used to perform at least one of: causing generation of the signal indicative of the concentration of the molecule or analyte; and collecting the signal indicative of the concentration of the molecule or analyte. Waveguides may suitably combined with the evanescent techniques. The waveguide may be arranged in a wall of the microfluidic channel, and, thus, efficiently guide electromagnetic radiation used for analysis or determination of concentrations of the analytes and the molecules to and/or from the detection zones.

FIG. 3 schematically illustrates a portion of a microfluidic channel 102 which may be used with the method 1 for measuring analyte concentration in a sample fluid or may be part of the microfluidic arrangement 100. Illustrated in FIG. 3 is a wall 150 of the microfluidic channel 102, having an inside 152, on which inside liquid, molecules and analytes may be present. The illustrated portion of the microfluidic channel 102 comprises a detection zone, which may be the first or the second detection zones 106 or 112, arranged in the first microfluidic channel 102. The surface 154 of the microfluidic channel is provided with affinity probes 156, of which one of a plurality is indexed with reference FIG. 156, for binding the molecule or the analyte to the surface, thereby allowing a signal indicative of the concentration of the molecule in the received dilution fluid or sample fluid to be measured in an affinity-based assay. The affinity probes in this example are linked to the surface 154 by optional linkers 158. The affinity probes 156 may be selected to be of a suitable type for performing affinity-based assay, which affinity-based assay may be an immuno-based assay, a receptor-based assay, an antigen-based assay, an aptamer-based assay, a nucleic acid-based assay, or a molecularly imprinted polymer-based assay. The affinity probes, thus, may, for example, comprise antibodies, polymers, aptamers, nucleic acids, and receptors, and other type of affinity materials.

The surface 154 of the first microfluidic channel 102 in the first detection zone 106, and the surface 154 of the first microfluidic channel 102 in the second detection zone 112, each may be adjacent to a waveguide 160, as further illustrated in FIG. 3. The waveguide 160 allows electromagnetic radiation 162, for example light, used for the assay to be guided and directed adjacent to the surface 154 of the microfluidic channel and the affinity probes 156. For at least one of the first affinity-based assay, the second affinity-based assay, and the third assay, such a waveguide 160 arranged adjacent to the surface 154 of the microfluidic channel 102 may be used to perform at least one of: causing generation of the signal indicative of the concentration of the molecule or analyte; and collecting the signal indicative of the concentration of the molecule or analyte.

The dilution fluid may be a buffer fluid. Thereby, a pH desired for the assays and/or suitable for the analyte and molecule may be selected. Further, suitable ionic strength and viscosity may be achieved with the buffer, or additives mixed in with the buffer.

Figure 4:
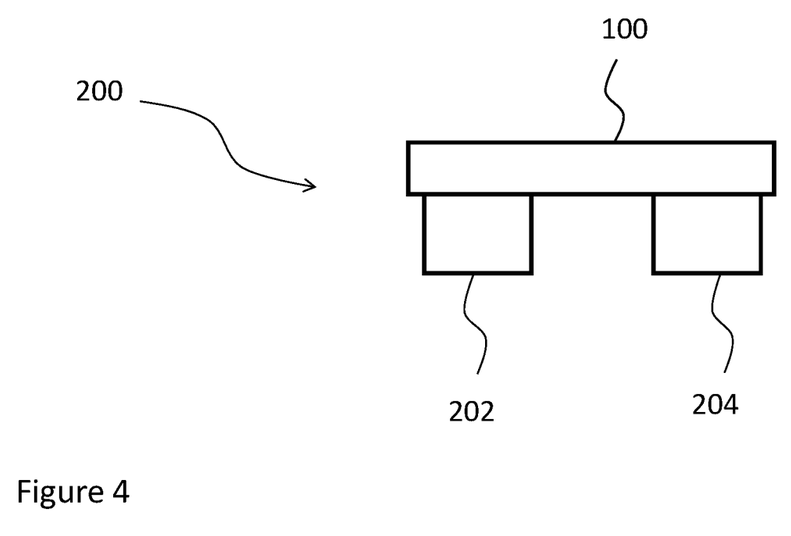
FIG. 4 is a schematic illustration of a system for measuring analyte concentration in a sample fluid.

FIG. 4 schematically illustrates a system 200 for measuring analyte concentration in a sample fluid. The system 200 comprises the microfluidic arrangement 100 of the second aspect, a detector 202 and a processing device 204. The detector 202 is arranged for detecting a signal indicative of the concentration of the molecule in the received dilution fluid or sample fluid, a signal indicative of the concentration of the molecule in the diluted sample fluid, and a signal indicative of the concentration of the analyte in the diluted sample fluid. The detector, which, for example, may be of a light sensitive type, is suitably connected to the first detection zone 106 and the second detection zone 112 for detection of molecules and analytes. The processing device 204 is arranged for determining a concentration of the molecule in the received dilution fluid or sample fluid, based on the detected signal indicative of the concentration of the molecule in the received dilution fluid or sample fluid; determining a concentration of the molecule in the diluted sample fluid, based on the detected signal indicative of the concentration of the molecule in the diluted sample fluid; and determining the analyte concentration in the sample fluid on basis of the detected signal indicative of the concentration of analyte in the diluted sample fluid and a ratio between the determined concentration of the molecule in the received dilution fluid or sample fluid and the determined concentration of the molecule in the diluted sample fluid.

Further provided is a diagnostic device (not illustrated) comprising the microfluidic arrangement according to the second aspect or the system according to the third aspect.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A method for measuring analyte concentration in a sample fluid, comprising:
 receiving dilution fluid or sample fluid comprising analyte in a microfluidic channel, wherein the dilution fluid or sample fluid further comprises a molecule which is different from the analyte,
 performing a first affinity-based assay in a first detection zone of the microfluidic channel to measure a signal indicative of the concentration of the molecule in the dilution fluid or sample fluid, mixing the dilution fluid or sample fluid in the microfluidic channel with another of the dilution fluid or sample fluid to obtain a diluted sample fluid, performing a second affinity-based assay in a second detection zone of the microfluidic channel to measure a signal indicative of the concentration of the molecule in the diluted sample fluid, performing a third assay in the second detection zone to measure a signal indicative of the concentration of the analyte in the diluted sample fluid, determining a concentration of the molecule in the received dilution fluid or sample fluid, based on the measured signal of the first affinity-based assay, determining a concentration of the molecule in the diluted sample fluid, based on the measured signal of the second affinity-based assay and determining the analyte concentration in the sample fluid on basis of the measured signal indicative of the concentration of analyte in the diluted sample fluid and a ratio between the determined concentration of the molecule in the received dilution fluid or sample fluid and the determined concentration of the molecule in the diluted sample fluid.

2. The method of claim 1, wherein, for at least one of the first affinity-based assay, the second affinity-based assay, and the third assay, an evanescent technique is used to perform at least one of: least one of:

causing generation of the signal indicative of the concentration of the molecule or analyte, and collecting the signal indicative of the concentration of the molecule or analyte.

3. The method of claim 1, wherein, for at least one of the first affinity-based assay, the second affinity-based assay, and the third assay, a waveguide arranged adjacent to a surface of the microfluidic channel is used to perform at least one of:

causing generation of the signal indicative of the concentration of the molecule or analyte, and collecting the signal indicative of the concentration of the molecule or analyte.

4. The method according to claim 1, wherein the determining the analyte concentration in the sample fluid comprises using a calibration curve.

5. The method of claim 1, wherein the third assay is an affinity-based assay.

6. The method according to claim 1, wherein an affinity-based assay is an immuno-based assay, a receptor-based assay, an antigen-based assay, an aptamer-based assay, a nucleic acid-based assay, or a molecularly imprinted polymer-based assay.

7. The method according to claim 1, wherein the molecule is selected to reduce cross-talk between the second affinity-based assay and the third assay.

8. The method according to claim 1, wherein the dilution fluid is a buffer fluid.

9. The method according to claim 1, wherein the analyte is a biomarker, and the sample fluid is a body fluid.

10. The method according to claim 1, wherein the molecule is provided in solid form in the microfluidic channel, and the molecule is added to the dilution fluid or sample fluid by contacting the dilution fluid or sample fluid with the molecule in solid form, thereby dissolving the molecule in the dilution fluid or sample fluid.

* * * * *